United States Patent [19]

Kay et al.

[11] 4,398,563
[45] Aug. 16, 1983

[54] MULTI-TUBE FLOW RESTRICTOR

[75] Inventors: George Kay, Anaheim; Alan Keskinen, Van Nuys, both of Calif.

[73] Assignee: Vacco Industries, South El Monte, Calif.

[21] Appl. No.: 306,134

[22] Filed: Sep. 28, 1981

[51] Int. Cl.³ .............................................. F15D 1/02
[52] U.S. Cl. ................................. 138/42; 137/625.37; 138/43; 181/268
[58] Field of Search ........................ 137/625.28, 625.3; 138/42, 43, 41; 181/268, 275, 281; 210/323.2, 500.1; 251/127

[56] References Cited

U.S. PATENT DOCUMENTS

| | | | |
|---|---|---|---|
| 199,512 | 1/1878 | Buzzell | 181/281 X |
| 2,583,206 | 1/1952 | Borck et al. | 138/42 X |
| 3,731,903 | 5/1973 | Webb et al. | 251/127 X |
| 3,941,350 | 3/1976 | Kluczynski | 138/42 X |
| 3,954,124 | 5/1976 | Self | 138/42 |
| 4,180,100 | 12/1979 | Kolb et al. | 137/625.3 |
| 4,212,321 | 7/1980 | Hulsey | 251/127 X |

Primary Examiner—Stephen Marcus
Assistant Examiner—Mark John Thronson
Attorney, Agent, or Firm—Frederick E. Mueller

[57] ABSTRACT

A fluid flow restrictor for spanning a passage of a body to minimize noise and cavitation in a high pressure fluid flowing through the passage and undergoing a substantial pressure drop in passing through the restrictor. The device comprises at least one tier of fixed perforated tubelets defining a myriad of tortuous flow paths with restricted orifices and expansion areas to dissipate energy in the fluid. The fluid flow through or between individual tubelets may be further subdivided into restriction orifices and expansion areas by additional fixedly held solid elements, e.g., BB shot tightly packed within the tubelets. The preferred inventive embodiment described is a sound suppressing, high pressure reducing poppet valve having several tiers, isolated from one another, of annular clamped arrays of parallel perforated tubelets.

25 Claims, 9 Drawing Figures

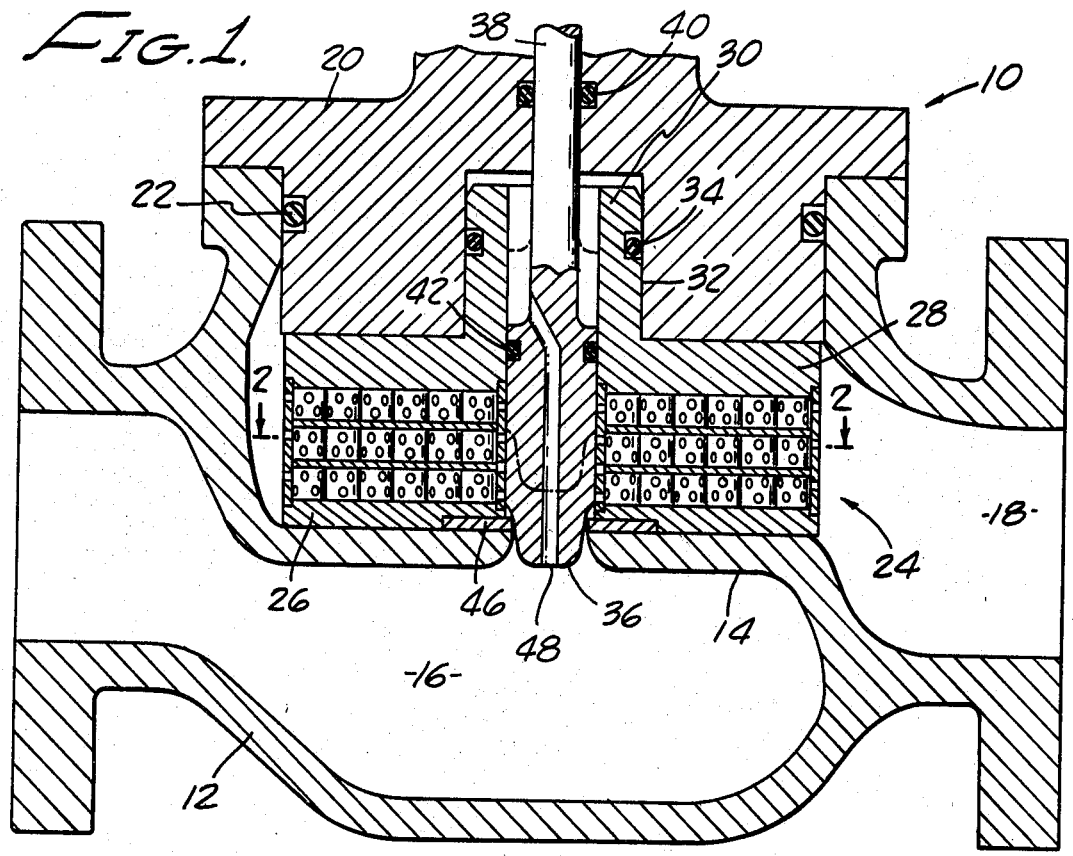
FIG. 1.
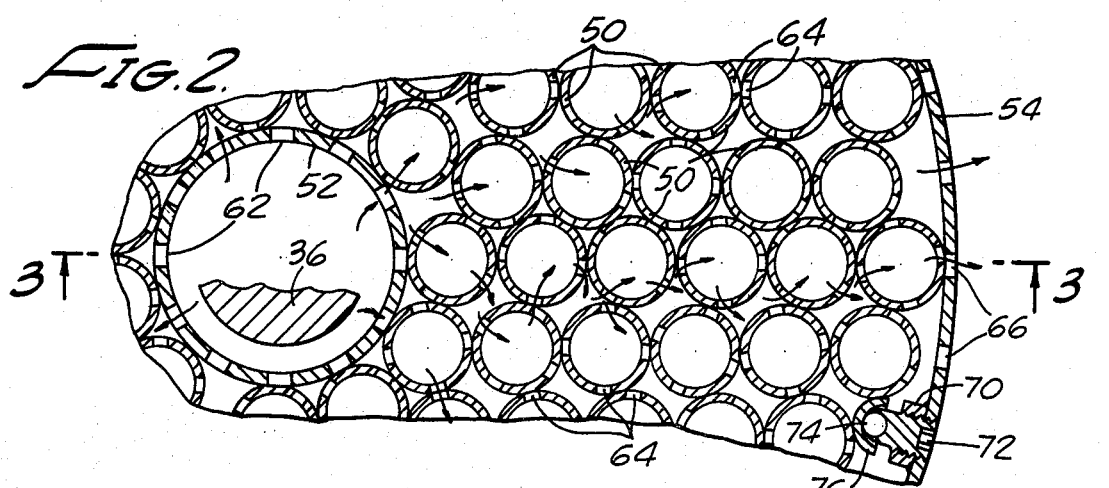
FIG. 2.
FIG. 3.

MULTI-TUBE FLOW RESTRICTOR

BACKGROUND OF THE INVENTION

1. Field of the Invention

This invention relates generally to the art of modulating the flow through a passage of a compressible or non-compressible fluid. More particularly, the invention relates to an improvement in fluid flow control devices, such as valves or regulators, to conduct a pressurized fluid relatively noiselessly through a substantial pressure drop.

2. Prior Art

A wide variety of mufflers, valves or regulators, and the like, have heretofore been devised for conducting pressurized liquids or gases through substantial pressure drops in a manner to minimize noise. Webb, et al., U.S. Pat. No. 3,731,903 discloses a cannister containing brazed together arrays of precisely stacked balls of various diameters to define a multiplicity of flow restrictions and expansion areas for a liquid stream. In Kubota U.S. Pat. No. 3,917,221 the flow restrictor geometry takes the form of a plurality of coaxially nested concentric peripherally grooved perforate sleeves. Engel, et al., U.S. Pat. No. 4,024,891 discloses a noise abating plug for a control valve comprising a perforated sleeve that is spanned by a plurality of spaced apart perforated discs.

Typically, the prior art devices require expensive custom made components and/or laborious and expensive assembly techniques to achieve a required orientation of the parts relative to one another, and they do not lend themselves to the ready development of a wide variety of types and sizes of inexpensive sound suppressing flow restrictors.

SUMMARY OF THE INVENTION

This invention provides an improved sound suppressor, for compressible or non-compressible fluids, that is made with inexpensive components that are easily assembled to define a myriad of intermixing tortuous paths having many series of restricted orifices and expansion areas.

To this end the invention provides, according to one of its aspects, a fluid conducting sound suppressing means in the form of a plurality of perforated wall tubelets, fixedly held in a parallel arrangement with mutual contact between their side walls, between a pair of solid plates which block the opposite ends of the tubelets. Typically, although not necessarily, this sound suppressing means is of annular configuration. Thus, in a control valve, each tier of tubelets is held between a perforated inner sleeve, which may also constitute a guide for a valve poppet, and an outer perforated band in communication with the valve outlet. A means is provided, preferably on the outer band, for radially constricting and thereby clamping the tubelets within the annulus of each tier into firm mutual engagement of their side walls.

The tubelets, if desired, may be essentially identical to one another but, in any event, the arrangement is such that each tubelet has a plurality of axially and angularly spaced apart circular perforations. The tubelets are preferably circular in cross section so that they may be disposed at random, without regard for the positions of the perforations relative to those of other tubelets so that all perforations of each tubelet are at least partially open and not blocked by any flush contact between walls of adjacent tubelets. The result is a myriad of flow paths, between the solid plates, into and out of each of the perforations of the individual tubelets, with successive restrictions and expansions of the fluid media and with substantial intermixing of the many fluid streams.

An alternative embodiment of the invention has the same basic structure as that just described but incorporates discrete solid elements to further subdivide the myriad of fluid streams. The added solid elements preferably take the form of relatively small BB shot such that several can be tightly packed within each or at least some individual tubelets to be held against displacement relative to one another by the pressure of the parallel spaced barrier plates. Such added discrete solid elements may also be tightly packed into the interstices between adjacent tubelets.

In yet another embodiment of the invention, some or all of the individual perforated tubelets contain a coaxially seated essentially cylindrical solid member having peripheral grooving to define a multiplicity of relatively small plenum areas intercommunicating a plurality of the perforations of the surrounding tubelet. The individual plenum grooves thus provide abrupt expansion areas for fluid entering some of the perforations of the surrounding tubelet, other perforations of the tubelet defining successive restrictions upon exit of the fluid.

In a further embodiment of the invention, some or all of the perforated tubelets may internally contain a coaxially nested essentially cylindrical solid member whose outer surface is formed with a helical groove. In this case the perforations of the surrounding tubelets are preferably also arranged in a somewhat helical pattern adapted to intersect various points of the helical groove of the solid insert. Again, the volume of the helical groove is so proportioned as to function as an expansion plenum.

Tube stock of many sizes is widely available commercially in perforated form in a great variety of hole sizes and arrangements, and is well adapted to the purposes of this invention. Similarly, solid spherical elements, such as BB shot, is also readily available in a variety of sizes. Other forms of solid tubelet inserts can be simply machined from common stock.

BRIEF DESCRIPTION OF THE DRAWINGS

FIG. 1 is a longitudinal section through a sound suppressing fluid handling device, in this instance, a valve, according to the invention;

FIG. 2 is a fragmentary section through the sound suppressor means taken on the line 2—2 of FIG. 1, on a larger scale and also shows a means for clamping the elements of the sound suppressor relative to one another;

FIG. 3 is a radial section on the line 3—3 of FIG. 2;

DESCRIPTION OF THE PREFERRED EMBODIMENT

Figure 4:
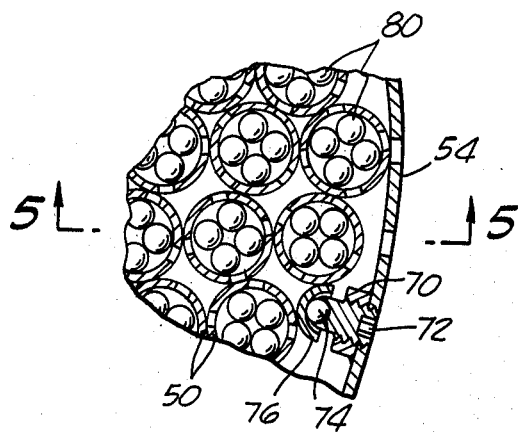
FIG. 4 is a partial section, similar to that of FIG. 2, but showing an alternate embodiment of the invention.

FIG. 1 schematically shows a typical high pressure fluid control valve 10. The valve has a hollow body 12 that is internally formed with a web 14 defining an inlet chamber 16 and an outlet chamber 18 within the body. The valve body and its outlet chamber 18 are closed at the top by a bonnet 20, fitted with appropriate seal means 22. It will, of course, be understood that the bonnet is secured to the valve body by appropriate fastening means, such as bolts (not shown).

In normal use of the valve, the inlet 16 receives a relatively high pressure fluid and the outlet 18 communicates to a relatively low pressure region such that the fluid undergoes a substantial pressure drop within the valve. During passage of the fluid through such pressure drop, it normally tends to generate substantial noise due to cavitation and other causes. The present invention suppresses or attenuates and thereby substantially reduces or eliminates such noise.

To this end, there is positioned within the valve body 12 a fluid energy dissipating or sound suppressing means 24 for conducting the incoming high pressure fluid relatively noiselessly through its pressure drop. The suppressor means 24, as will be described in detail below, defines a myriad of tortuous, intertwining, sometimes intersecting and merging fluid streams involving a great series of constrictions and expansions of the fluid media, thus dissipating fluid energy in a manner which suppresses or eliminates cavitation noise and other noise while providing a desired fluid flow rate through the valve.

The suppressor means 24 may, if desired, be incorporated as one element of a replaceable cartridge for the valve 10. Thus, in the illustrated embodiment, the suppressor means 24 is confined between a rigid annular bottom plate 26 and a rigid annular top plate 28. The top plate 28 may be integrally formed with an upstanding cylindrical boss 30 adapted to be coaxially slideably received within a corresponding counterbore 32 formed in the valve bonnet 20. A suitable seal ring 34 is provided between the boss 30 and the wall of the counterbore 32.

The cylindrical boss 30 provides a clearance and guide for reciprocation of a poppet valve 36 having a reduced diameter operating stem portion 38 extending through an opening in the valve bonnet 20. An appropriate seal means 40 is provided for the stem of the poppet and, similarly, another seal means 42 is provided on the body of the poppet in sliding relation to the inner wall of the boss 30.

The suppressor means 24 is sandwiched between the top plate 28 and the lower plate 26. This cage structure may be held in assembled relationship by any appropriate fastening means, for example by brazing the two plates to the peripheries of axially opposite faces of the means 24. As shown, the lower face of the bottom plate 26 may be provided with a central circular depression defining a shoulder for mounting a replaceable poppet seat ring 46. The poppet nose may have a tapered seating surface and a contoured angle end for flow control characteristics, if desired, and incorporates a central drill passage 48 from the inlet side to the top of the poppet for pressure balancing to minimize actuation loads.

Referring to FIGS. 2 and 3, the suppressor means 24 comprises at least one tier of a plurality of perforated tubelets 50 snugly embraced between an inner perforated sleeve 52 and an outer band 54. As is best shown in FIG. 3, three suppressor tiers 24a, 24b, and 24c are shown in an assembly within a single inner sleeve 52 and a single outer band 54. At their inner and outer edges the confronting faces of the lower plate 26 and upper plate 28 are formed with annular shoulders for seating the opposite axial ends of the sleeve 52 and band 54, while a pair of solid annular plates 58 and 60 serve to isolate the tiers 24, 24a, 24b, and 24c from one another. In the illustrated embodiment, it is assumed that flow of the fluid media is radially outward. That is, the high pressure fluid enters the perforated sleeve 52 and, depending on the position of the poppet 36, exits the sleeve radially outwardly in separate strata through the tiers 24, through the outer band 54 and into the low pressure chamber 18. As shown, the I.D. of the sleeve 52 is sized to coincide with that of the cylindrical boss 30 to also serve as a guide for the poppet 36.

In normal use of the sound suppressing valve 10, the valve member 36 is moveable to its solid line closed position on the seat 46, as shown in FIG. 1, to block all fluid flow through the valve. The valve member is moveable to its broken line partially open position, or to any intermediate or further position, to permit fluid flow from the inlet chamber 16, through one or more of the tiers 24, 24a, 24b, and 24c of the suppressor means 24, to the outlet port or chamber 18. During flow of the fluid through the means 24, the fluid energy is progressively dissipated to eliminate or suppress cavitation and noise.

In order to define a myriad of fluid flow paths, the inner sleeve 52, individual tubelets 50 and outer band 54 are each formed with a plurality of circularly and axially spaced apart perforations 62, 64 and 66, respectively. In the case of the inner sleeve 52 and outer band 54, the perforations should, of course, be drilled in the stock from which made at locations which will provide ready fluid communication with the tiers 24. Thus, in the case of the inner sleeve 52 the perforations 62 may be uniformly spaced apart, circularly and axially, while in the case of the outer band 54, all of the perforations 66 for each tier may, if desired, consist of a single circular band of perforations equally spaced apart.

A plurality of the individual tubelets 50 may be made from a single long length of standard perforated tube stock, preformed with equally circularly and axially spaced apart perforations 64. The tubelets 50 are preferably, although not necessarily, of circular cross-section, while the perforations 64 are also preferably of circular form. However, it should be recognized that tubelets of non-circular cross-section and/or having non-circular perforations may be employed. However, circular tubelets with circular perforations are much to be preferred, since, as can be seen from FIG. 2, they readily lend themselves to the definition of fluid flow passages between the outer surfaces of adjacent tubelets and such tube stock is readily available in a wide variety of diameters, wall thicknesses, and hole sizes and spacings.

The use of ordinary perforated tube stock, out of which individual tubelets 50 of appropriate length have been cut by a simple machining operation, enables a very simple method of assembly of the suppressor means 24. Thus, referring to FIGS. 2 and 3, an appropriate number of individual tubelets 50 may be placed on a supporting surface, such as the bottom plate 26 or one of the solid divider plates 58, 60, to substantially fill the annular area between the inner sleeve 52 and outer band 54, in a random manner. That is to say that the only criterion is to place the individual tubelets on their supporting surface in parallel abutting relationship of their side walls without regard to the orientation of the openings 64 of the tubelets. As will be seen, adjacent tubelets have only longitudinal tangent line contact whereby no perforation 64 can be blocked or closed by the wall surface of a contacting tubelet.

The circular shape of the perforated tubelets 50 also lends itself very well to final assembly of a tier 24 in a manner to firmly lock all of the array of tubelets of a tier into tight mutual engagement in order to eliminate their individual vibration. For this purpose, a means is provided at each tier for contact with at least one of the tubelets to transmit pressure therethrough to all of the tubelets of the array to pack them together.

As shown in FIG. 2, the tubelet locking means may take the form of a short internally threaded cylindrical stub 70 that is welded, or otherwise fixedly secured, to the inner face of the outer band 54. The member 70 threadedly receives an adjustment screw 72 that projects radially inwardly and terminates at its inner end in a swaged socket to swivelly seat a ball 74 that, in turn, fixedly mounts an essentially semi-spherical nose cap 76. The radius and area of the outer surface of the cap 76 is such that as the adjustment screw 72 is turned inwardly, the cap 76 seats itself, in a somewhat self-centering mode, against wall surfaces of tubelets 50 with pressure that is transmitted through the mutual wall contact of the entire array of tubelets so that they all wedge themselves tightly together within the physical constraints provided by the inner sleeve 52 and outer band 54.

From inspection of FIG. 2, it can now be seen that an assembled tier 24 of perforated individual tubelets 50 provides a vast number of interweaving and merging, radially progressing flow paths through the suppressor element with the flow streams being forced to change direction while flowing in a serpentine manner through the stack to ultimately exit the perforations 66 of the outer band 54. The combined effects of repeated changes of direction, contraction, expansion and passage friction serve to effectively dissipate the fluid energy while reducing high pressure to low pressure and avoiding excessive noise and cavitation. The present invention enables this result to be achieved in a highly advantageous, economical manner by utilizing lengths of readily available geometries of perforated tube material randomly aligned relative to one another. The invention can be employed in severe service conditions in that it can withstand very high differential pressures, high shock and vibration loads and extreme temperature conditions without being damaged, assuming that appropriate materials are employed which are compatible with the media to be flowed through the device. The suppressor can also be readily disassembled and reassembled for cleaning, service and maintenance.

As indicated in FIG. 3, the solid plates 58 and 60 and upper and lower plates 26 and 28 essentially block the otherwise open ends of the individual tubelets 50. The barrier plates 58 and 60 can be eliminated, however, it is highly preferable to use such spacer discs to keep radial flow in layers, in lieu of allowing vertical flow through the stack. In any event, it will, of course, be appreciated that flow can be in either direction, inward or outward, as demanded by a particular application.

As can be seen from FIG. 2, there is a substantial amount of open area between the tubelets and within the tubelets. In some cases, it may be desirable to further subdivide the fluid passing therethrough. This can be readily accomplished, also by the utilization of small commonly available individual solid elements.

Figure 5:
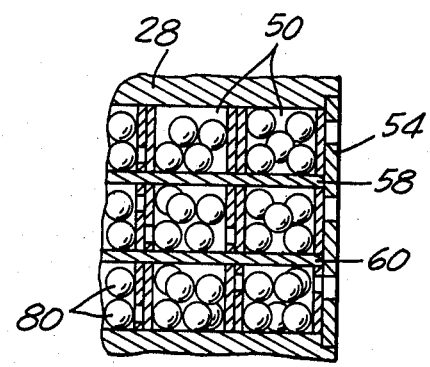
FIG. 5 is a fragmentary section on the line 5—5 of FIG. 4.

For this purpose, in another embodiment, shown in FIGS. 4 and 5, some or all of the individual tubelets 50 may be packed with a quantity of solid elements such as spherical, relatively small BBs 80. These elements 80 are tightly packed within the individual tubelets, although this can only be schematically indicated on the scale of these drawings. The stacking of the elements 80 need not take any particular form, the only criterion being a size selection, such as diameters of BBs 80 relative to the space they occupy such that the surrounding walls and clamping surfaces such as upper plate 28 and solid plate 58 achieve firm mutual contact of the surfaces of all of the elements 80 to hold them firmly in place under pressure conditions. As will be appreciated, such BBs 80 can also be tightly packed into the interstices between adjacent tubelets 50.

Figure 6:
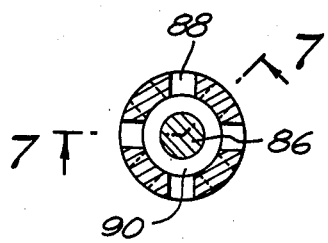
FIG. 6 is a transverse section of an alternative embodiment of tubelet and solid insert.
Figure 7:
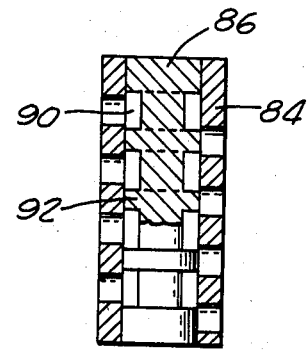
FIG. 7 is a longitudinal section on the line 7—7 of FIG. 6.

Another embodiment of tubelet construction is shown in FIGS. 6 and 7. In this case, in lieu of tubelets 50, each stack 24 comprises a plurality of tubelets 84 which interiorly coaxially seats or nests a solid essentially cylindrical element 86 of the same length as the surrounding tube. The tubelet 84 is formed with a plurality of circularly and axially spaced apart perforations 88, for example, in circumferential sets of four as indicated in FIG. 6. The solid insert 86 is machined to define a plurality of grooves 90 separated by circumferential lands 92. For example, as shown in FIG. 7, four grooves 90 ae depicted such that there is a single groove for each circumferential set of four perforations 88. Preferably, each groove 90 has a width larger than the diameter of perforation 88. In any event, the volume of a groove 90 is such as to provide an expansion annulus or plenum for fluid entering some of a circumferential set of perforations 88. In order to achieve energy dissipation, energy is also dissipated by the bends provided in the flow of the fluid media as it enters and leaves the assembly.

Figure 8:
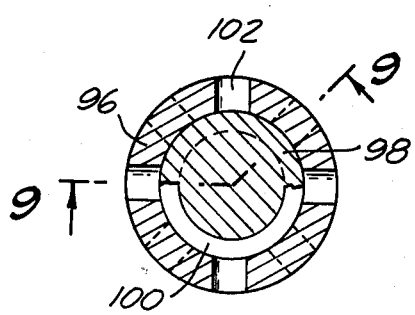
FIG. 8 is a transverse section of another embodiment of perforated tubelet and solid insert.
Figure 9:
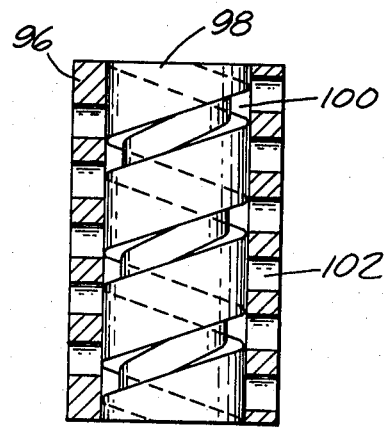
FIG. 9 is a longitudinal section on the line 9—9 of FIG. 8.

In yet another embodiment, the tubelets 50 may be replaced with the structure shown in FIGS. 8 and 9. In this case, a perforated tubelet 96 contains a machined solid insert 98. The two pieces are of essentially the same length, with the insert 98 having an outer diameter such as to nest coaxially within the tube 96. A helical annulus groove 100 is machined into the outer surface of insert 98 to come into registration with some at least out of a somewhat helically arranged series of perforations 102 formed in the wall of the tubelet 96. Again the cross-sectional area of the groove 100 is such as to provide an expansion plenum or annulus for fluid entering some of the perforations 102 to be later discharged through others of the perforations 102.

While the preferred and alternative embodiments have been set forth in detail, it should be understood that the invention is not limited to the details of construction and the arrangements of the components set forth in the description or illustrated in the drawings. As will be apparent to those in the art, the invention is capable of other embodiments and of being practiced and carried out in various ways. It should also be understood that the phraseology and terminology employed herein are for the purposes of description and should not be regarded as limiting.

We claim:

1. A sound suppressing flow restrictor for pressurized fluid comprising:
   a housing having inlet and outlet ports and a fluid passage communicating said ports;
   a plurality of tubelets;
   means comprising a spaced pair of plates obstructing opposite ends of each of said tubelets and between which said tubelets are clamped for fixedly holding said tubelets in eccentric parallel relationship to one another with the walls of said tubelets spanning said fluid passage and also defining interstices between the walls of adjacent tubelets; and
   means defining a myriad of tortuous fluid energy dissipating paths extending from the inlet side to the outlet side of said plurality of tubelets and comprising perforations in said walls of said tubelets, said interstices, and the interiors of said tubelets.

2. The flow restrictor of claim 1 wherein:
   said tubelets are held in mutual contact of portions only of the side walls of adjacent ones of said tubelets.

3. The flow restrictor of claim 1 wherein:
   said tubelets are of circular cross-sectional configuration.

4. The flow restrictor of claim 1 wherein:
   said means for fixedly holding said tubelets comprises a means for constricting said plurality of tubelets into mutual engagement of their side walls.

5. A flow restrictor as in claim 1 wherein:
   at least some of said plurality of tubelets fixedly mount a plurality of discrete solid objects for further subdividing fluid.

6. A flow restrictor as in claim 1 wherein:
   at least some of said plurality of tubelets internally fixedly mount a means for further subdividing fluid.

7. The flow restrictor as in claim 1 wherein:
   said tubelets are clamped to be fixedly arranged in eccentric parallel relationship to one another with mutual contact of portions only of their sidewalls, to leave at least some perforations open for fluid communication between the inside and outside of said tubelets.

8. A flow restrictor as in claim 7 wherein:
   said tubelets are mounted in an annular array between a central perforated sleeve and an outer perforated band.

9. A flow restrictor as in claim 8 wherein:
   a rigid means surrounds said plurality of tubelets to constrain them in said parallel relationship,
   said rigid means being perforated at opposite sides for fluid communication into and out of said array of tubelets, and
   a means is mounted on said restrictor for pressing said tubelets into firm mutual contact of their side walls.

10. A flow restrictor as in claim 7 wherein:
    at least some of said plurality of tubelets fixedly mount a means for further subdividing fluid passing through said tubelets.

11. A flow restrictor as in claim 10 wherein:
    said means for subdividing comprise a plurality of discrete solid objects.

12. A flow restrictor as in claim 11 wherein:
    said discrete solid objects comprise spherical members.

13. A flow restrictor as in claim 10 wherein:
    said means for subdividing comprise a solid insert fixedly nested within a tubelet,
    said tubelet and said insert having shape characteristics defining at least one fluid expansion plenum with said insert.

14. A flow restrictor for pressurized fluid comprising:
    a tier of an annular array of perforated tubelets;
    a pair of solid annular plates between which said tubelets are fixedly held in eccentric parallel relationship, the opposite ends of said tubelets being closed by said pair of plates;
    a perforated sleeve at the radially inner edge of said plates and said annular array of tubelets; and
    a perforated band at the outer edge of said plates and said annular array of tubelets.

15. A flow restrictor as in claim 14 wherein:
    said tubelets are of circular cross section and have perforations circularly and axially spaced apart on the walls thereof.

16. A flow restrictor as in claim 15 wherein:
    said tubelets are held into mutual contact of the side walls of adjacent ones of said tubelets.

17. A flow restrictor as in claim 14 that includes:
    a means on said tier for pressing said tubelets into tight mutual engagement of the side walls of said tubelets and of inner and outer ones of said tubelets with said inner sleeve and outer band.

18. A flow restrictor as in claim 17 wherein said pressing means comprises:
    a means oriented transversely relative to said tier of tubelets for adjustable movement radially of said tier to press said tubelets.

19. A flow restrictor as in claim 14 wherein:
    a plurality of discrete solid objects are fixedly held among said plurality of tubelets for further subdividing fluid flow therepast.

20. A flow restrictor as in claim 19 wherein:
    said solid discrete objects comprise spheres.

21. A flow restrictor as in claim 20 wherein:
    a plurality of said spheres ae tightly packed within some, at least, of said tubelets.

22. A flow restrictor as in claim 19 wherein:
    said discrete objects comprise solid inserts within some, at least, of said tubelets; and
    said tubelet and said insert have shape characteristics defining at least one fluid expansion plenum within said insert.

23. A flow restrictor as in claim 22 wherein:
    said tubelets are cylinders; and
    said inserts are cylinders formed with a plurality of circumferential grooves defining said expansion plenum.

24. A flow restrictor as in claim 22 wherein:
    said tubelets are cylinders; and
    said inserts are cylinders formed with a helical groove defining said expansion plenum.

25. The flow restrictor as in claim 1, wherein:
    at least one intermediate plate is disposed between and parallel to said plates for dividing the tubelets into a plural stacked tubelet assembly.

* * * * *